United States Patent Office 3,466,950
Patented Sept. 16, 1969

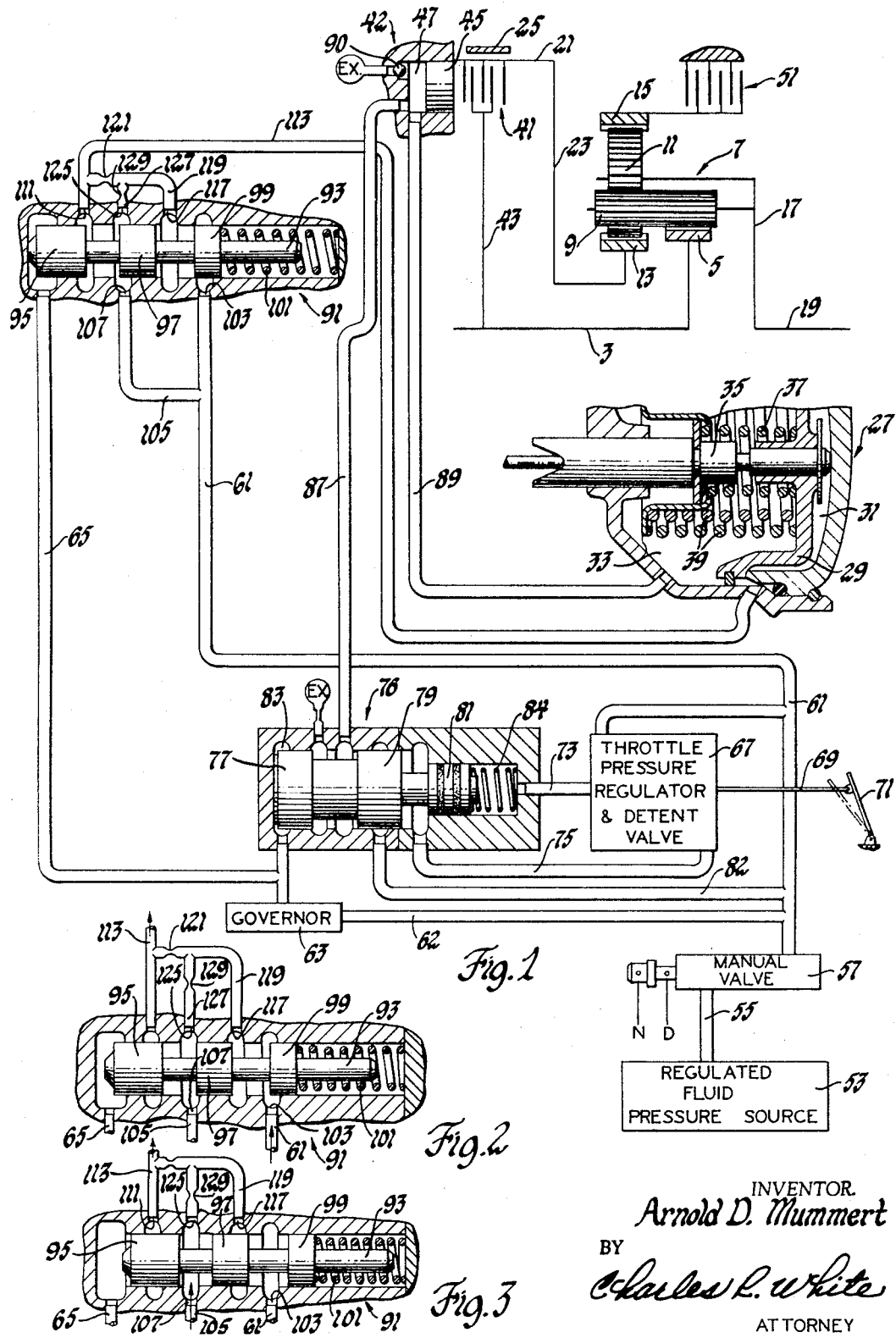

3,466,950
AUTOMATIC TRANSMISSIONS WITH SHIFT TIMING VALVE
Arnold D. Mummert, Farmington, Mich., assignor to General Motors Corporation, Detroit, Mich., a corporation of Delaware
Filed Jan. 31, 1968, Ser. No. 702,018
Int. Cl. B60k 19/14
U.S. Cl. 74—868                                    7 Claims

ABSTRACT OF THE DISCLOSURE

A geared, change-speed, power transmission including controls for automatically changing the gear ratios, having a multistage downshift timing valve that controls the rate of fluid flow to the low servo apply chamber in accordance with vehicle speed to appropriately calibrate power-on high clutch to low brake downshifts at low, intermediate and high vehicle speed.

---

This invention relates to automatic transmissions and more particularly to transmissions with a multistage timing valve for calibrating the rate of apply of a fluid operated friction-drive-establishing device.

In automatic transmissions having speed and torque response shift valves for effecting the shift of the transmission gear ratios, it is desirable that the rate of apply of the low range friction device, which is usually a band, be timed with the disengagement of the high range frictional device for power-on downshifts for all vehicle speeds to provide for smooth high-to-lower-range shifting. If the low engagement is late, the engine will flare; and the shift will be rough. If the low servo engagement is premature, the transmission output torque will often drop to a negative value sufficient to cause momentary brake band de-energization resulting in a rough shift.

The timing valve of this invention controls the feed of fluid pressure from a regulated fluid pressure source to the low servo and supplies the feed of this low servo apply fluid at three different flow rates dependent upon governor pressure. This valve of this invention has a one-piece valve element, which is not particularly sensitive to manufacturing tolerances, element position or adjustment, movably disposed in a valve body bore to different positions to establish the different flow rates. One end of the valve is in communication with governor pressure indicating vehicle speed and the other end is engaged by a single spring element. The valve has a first position established by low governor pressure which provides unrestricted flow between the fluid pressure source and the low servo. When governor pressure increases in response to intermediate vehicle speeds, the valve element will move to a second position to provide a restricted fluid flow passage from the pressure source to the low servo so that the time of low range friction device engagement will be lengthened to provide smooth power-on downshifts. At high vehicle speeds, governor pressure moves the valve to a third position in which the fluid flow is restricted by a smaller orifice or restriction so that the time of engagement of the low range friction device will be further extended to provide for smooth power-on downshifts. In the preferred embodiment of the invention the restrictions are in fluid delivery lines leading from the valve to a servo motor which applies the low range brake.

The unitary, multistage valve element of this invention has many important advantages over the multipart prior flow control valves; manufacture is materially enhanced, and durability and reliability are improved since the valve element has no moving parts. Since there is no metering of fluids by the lands, the lands do not have metering flats or have been held to extremely close tolerances particularly in their longitudinal dimension; the valve element is not as sensitive to precise positioning as prior art valves and can have slightly different settings for low, intermediate and high positions. Furthermore only one spring is utilized as compared to dual spring systems in some other flow control valves in which the second spring is used a a stop for positioning the valve element at a predetermined position.

An object of this invention is to provide a new and improved multistage fluid flow control valve for a servo controlling the operation of a friction-drive-establishing device having a valve element positionable to establish a flow rate to the servo for calibrating the low servo apply.

Another object of this invention is to provide a timing valve in a transmission having a unitary valve element which is movable to first, second and third positions to respectively provide high, intermediate and low flow rates to a servo motor for a friction-drive-establishing device to vary the time of engagement thereof in accordance with transmission output speed.

Another object of this invention is to provide a multistage high speed timing valve having a one-piece valve element which facilitates manufacture, assembly and disassembly and which does not require highly precise positioning in a valve body to establish three different flow rates to a fluid operated motor mechanism.

These and other objects of the invention will become more apparent from the following detailed description and drawings in which:

FIG. 1 is a diagrammatical illustration of a transmission control incorporating the flow control valve of this invention.

FIGURES 2 and 3 are views of the flow control valve of FIG. 1 showing the valve element moved to different positions for controlling flow rate.

The vehicle transmission of FIG. 1 includes a drive shaft 3 drivingly connected to a sun gear 5 of a planetary gear set 7. This sun gear meshes with long pinions 9 which in turn mesh with short pinions 11. The short pinions mesh with a sun gear 13 and a ring gear 15. Pinions 9 and 11 are rotatably mounted on a carrier 17 which is drivingly connected to an output shaft 19. A drum 21, connected by a hub 23 to sun gear 13, has an outer annular friction surface engageable by a single or double wrap friction band 25 having an anchor end connected to the transmission casing and an apply end operatively connected to a low servo 27.

The low servo has a housing which is separated by a piston 29 into fluid-receiving apply chamber 31 and release chamber 33. The piston is mounted for limited axial movement on the piston rod 35 which is connected by a force transmitting link to the apply end of the brake band. A cushion spring 37, disposed between the piston and the piston rod, cushions the transfer of piston apply force to the rod 35; springs 39, disposed between the piston, and the servo housing, control the rate of band apply and operate to provide a release force for the band disengagement.

When band 25 is frictionally engaged with the drum 21 by sufficient low servo apply force to retard the drum 21 and the connected sun gear 13 from rotation, the gear set will be fully conditioned for a low speed ratio as sun gear 5 is driven by the shaft 3.

A friction clutch 41 has a first series of friction plates splined internally to the drum 21 and a second series of plates splined to the outside of an annular hub 43 connected to shaft 3. Clutch 41 is operated by high servo 42 formed by an annular piston 45 mounted in a recess in an extension of drum 21. This construction provides a chamber 47 which can be supplied with drive line fluid to effect the outward axial movement of piston 45 and the engagement of the friction plates. This engagement connects the sun gears to lock up the gear set and condition it for direct drive ratio. Conventional release springs for this piston, not illustrated, may be utilized to move the piston from engagement with the friction plates when fluid is exhausted from chamber 47.

A reverse brake 51, similar in construction to the clutch 41, is engageable by a servo, not shown, to ground the ring gear 15 to the transmission case to condition the gear set for reverse drive.

FIGURE 1 further shows a control system for the gearing described above. This system includes a regulated fluid pressure source 53 which feeds main line 55 leading into a manual valve 57. The manual valve has a valve element which is movable to different control positions including the neutral position N in which the main line 55 is blocked and a drive line 61 leading from the manual valve is exhausted. This valve element is also movable to drive position D in which the main line is hydraulically connected to the drive line. The drive line 61 is connected to a governor, a throttle valve, a detent valve and a high speed downshift timing valve described below.

The drive line 61 is connected by line 62 to a conventional governor 63 which includes a pressure regulator valve, the output of which is determined by the speed of output shaft 19. The governor output is delivered to governor line 65. Drive line 61 is connected to conventional throttle and detent valves diagrammatically illustrated at 67. These two valves are connected by linkage 69 to the accelerator 71 which directly controls the throttle valve or TV pressure supplied to the throttle valve line 73 and the detent valve line 75. The throttle valve has a valve element which opens and closes the inlet port to the drive line to regulate throttle valve pressure at given positions of the accelerator. The detent valve connects TV pressure to the detent line when the accelerator is moved to an open throttle position illustrated in phantom lines. This position is known as the through-detent position. At lower accelerator positions the detent valve exhausts the detent line and blocks entry of TV pressure into line 75.

The low-drive shifter valve 76 has a valve element, possessing lands 77, 79 and 81, and is axially movable in a bore in the valve body. Branch line 82 connects drive line 61 to an inlet port in this valve. Governor line 65 is connected to a blind cavity 83, formed by land 77 and one end of the bore. Governor pressure in this cavity provides an upshift bias on the valve element. TV line 73 is connected to a blind cavity, formed by land 81 and the other end of the bore. Pressure supplied by the throttle valve and the force of a coil spring 84 in this latter cavity urges the valve element toward a downshift position and against the upshift bias force of the governor pressure. Detent line 75 is connected to the shifter valve between the lands 79 and 81 to provide a force which acts on the differential area provided by lands 79 and 81 to hold the shifter valve in a downshift position at high vehicle speed when the force of governor pressure on the shifter valve would be normally greater than the force of the TV pressure and the force of spring 84.

When downshifted, the shifter valve element opens a high servo line 87 hydraulically connecting the shifter valve 76 and high servo chamber 47 to exhaust. When upshifted, the shifter valve element connects this line to the drive line 61. Fluid supplied to the high servo is also fed to a band release line 89 leading into the low servo release chamber 33. When drive fluid is admitted into this latter chamber, the pressure on both sides of the piston will be the same; and the release springs can operate to back the brake band off the friction drum 21 as the high clutch is engaged by piston 45. The ball check valve 90 in the high servo opens in reverse and neutral to exhaust any fluid which might be trapped in chamber 47 to prevent partial clutch engagement and also opens when the chamber 33 is being exhausted to assist in the timing of the high clutch release and low band apply.

The transmission gearing and the controls described in detail above provide an environmental setting for the three-stage high speed downshift timing valve of this invention which meters drive line fluid flow to the low servo apply chamber at a rate appropriate to vehicle speeds to provide for smooth downshifts at all vehicle speeds where power-on down-shifting can occur. With a fairly fast clutch servo exhaust such as that obtainable with the FIG. 1 construction, the higher the vehicle speed, the more slowly the brake band should be applied to calibrate the power-on downshift. Since the clutch is quickly exhausted, the clutch torque is always dropped to zero rapidly and at a substantially constant rate so that engine torque is available to accelerate the engine during the short transient interval between clutch disengagement and brake engagement. With such short transient intervals, any momentary disturbance to acceleration is small. However, the time for apply of the low servo which is proper for a low vehicle speed downshift is not long enough for power-on downshifts at higher vehicle speeds. This time must be adequately extended during such downshifts to permit the low brake to more slowly engage for a smooth shift. By properly metering the flow rate to the low brake servo, early and late brake engagements are prevented for all vehicle speeds. This is important since when there is a power-on downshift, the change in engine speed increment is greater at higher vehicle speeds and a longer time is needed for low servo apply for smooth shifting to eliminate engine flare and to reduce brake band wear. For example at 25 m.p.h. the engine speed may be 1,050 r.p.m. before downshifting. When there is a power-on downshift, the engine speed will accelerate to 1,450 r.p.m. Since the speed change increment is only 400 r.p.m., the low brake band can be rapidly engaged as the high clutch is released. However, this time of engagement would not be satisfactory at higher vehicle speeds where the engine speed change increment is much greater. For example as the vehicle speed is 60 m.p.h. and the engine speed is 2,500 r.p.m., the engine will accelerate to 4,000 r.p.m. when there is a power-on downshift. A quick engagement of the low brake band would produce a rough shift and a late engagement would result in engine flare and unnecessary wear on the brake band. Accordingly, the timing valve of this invention stretches out the time of brake band apply for both intermediate (25–40 m.p.h.) and high (above 40 m.p.h.) vehicle speeds.

As shown in FIGS. 1–3, the timing valve 91 has a valve body formed with a bore in which a valve element 93 is axially movable. This valve element is formed with three lands 95, 97 and 99. Land 95 blocks one end of the bore to provide a blind cavity which is connected to governor line 65. Governor pressure in this cavity will urge the valve element toward the right and against the opposing force of the coil spring 101 seated in the other end of the bore and in engagement with the land 99. Drive line 61 is connected to a first inlet port 103 and is also connected by a branch line 105 to a second inlet port 107. The downshift valve has a first outlet port 111 which is connected to the low servo apply line 113; a second outlet port 117 is connected to line 113 through a branch line 119 having a restriction 121 formed therein for metering the flow from line 119 into the low servo apply line 113. A third outlet port 125 is connected by a branch line 127 to the line 119 down stream of the restriction 121 and through the line 119 to the low servo apply line 113. Line 127 is formed with a fluid metering restriction 129 which is smaller than the restriction 121 in line 119.

In a closed throttle position the vehicle will be traveling at low speeds up to 25 m.p.h. and the downshift timing valve will be in the FIG. 1 position. In this valve position there is unrestricted passage of drive line fluid through line 105 and inlet port 107 to the outlet port 111 and between the timing valve lands 95 and 97. When the shifter valve moves to the downshift position of FIG. 1, the pressure chamber 47 for the high clutch and the release chamber 33 of the low servo will be exhausted and the fluid supplied to the low servo apply chamber 31 will move the brake band into full engagement in a predetermined time. Since engine acceleration is low, the shift will be properly timed and will be smooth. At higher vehicle speeds, 25–40 m.p.h., the timing valve will be moved to a position such as that illustrated by FIG. 2. The higher governor pressure on land 95 has moved the valve element 93 to an intermediate station where the forces of governor pressure and the spring 101 are balanced. In this position land 99 has moved away from the inlet port 103 so that there is fluid flow from port 103 to the outlet port 117 and through the timing restriction 121 to the low servo apply line. The restriction 121, which is larger than restriction 129, will meter the flow of fluid from the drive line to the low servo apply line to provide for a slower apply rate for the low servo piston. The delay in application of the low brake band will permit the engine to accelerate without flare to a higher speed and will provide the desired smooth shifting. The larger restriction, however, feeds drive line fluid at a rate sufficient to prevent low band engagement and engine flare. The valve could have an intermediate position slightly to the right or left of the illustration and still provide the timed downshift since the metering is accomplished by restriction 121 and not land 97.

At higher vehicle speeds the timing valve will be moved to the FIG. 3 position since governor pressure on land 95 has increased. The valve outlet ports 111 and 117 are blocked by lands 95 and 97; however, the low servo apply line 113 is connected to the drive line by branch line 105, timing valve inlet port 107 and outlet port 125. The smaller restriction 127 will meter the flow of fluid into the low servo apply line 113 at a slower rate as compared to the FIGS. 1 and 2 timing valve positions, and the engagement time of the low servo is further extended as compared to the engagement time for intermediate speeds. This provides for the increased delay on power-on downshifting and permits the band to frictionally engage and hold the drum 21 which was rotating at the higher speed.

From the above it will be appreciated that applicant has provided a material improvement in flow control valves which can appropriately calibrate the apply of the low brake for all vehicle speeds for power-on downshifts. This calibration results in lengthening the rate of low brake band apply for higher vehicle speeds for decreasing the overlap between the high clutch and low brake.

The valve of this invention facilitates manufacture since only one valve element is made for each valve and there is no appreciable metering of fluid by the valve lands thus eliminating metering flats. Transmission control assembly and disassembly are enhanced since fewer parts have to be handled.

Although a preferred embodiment of the invention has been shown and described, other modifications may be made without departing from the invention which is limited only by the following claims.

I claim:
1. In a transmission having a gear unit providing a plurality of transmission gear ratios, a friction-drive-establishing device selectively engageable with a portion of said gear unit to establish one of said ratios, fluid-operated servomotor means for effecting the engagement of said friction-drive-establishing device, a fluid input line, an output line connected to said servomotor means, a flow control valve for delivering fluid from said input line to said output line at any one of a plurality of different flow rates to activate said servomotor means and to calibrate the engagement of said friction-drive-establishing device, said valve having a plurality of inlet ports operatively connected to said input line and a plurality of outlet ports operatively connected to said output line, said valve having a unitary valve element movable to a first position to connect one of said inlet ports to one of said outlet ports to provide a first flow passage through said valve and a first flow rate to said servomotor means to effect the engagement of said friction-drive-establishing device in a first time period, and movable to a second position to connect another of said inlet ports to another of said outlet ports to provide a second flow passage through said valve and a different flow rate to said servomotor means to effect the engagement of said friction-drive-establishing device in a second time period, and being further movable to a third position to connect one of said inlet ports to a third of said outlet ports to provide a third flow passage through said valve and another different flow rate to said servomotor means to effect the engagement of said friction-drive-establishing device in a third time period.

2. In a transmission having a gear unit providing a plurality of transmission gear ratios, a friction-drive-establishing device selectively engageable with said gear unit to establish one of said ratios, fluid-operated servomotor means for moving said friction-drive-establishing device into engagement with said gear unit, a timing valve having a plurality of inlet ports and a plurality of outlet ports, a fluid pressure source, said inlet ports being connected by fluid passage means to said fluid pressure source, a fluid output line connecting to said valve and said servomotor means, one of said outlet ports being connected directly to said fluid output line, fluid passage means connecting another of said outlet ports to said fluid output line, said fluid passage means having a fluid metering restriction therein, a second fluid passage means having a fluid metering restriction for connecting a third of said outlet ports to said fluid output line, said valve having a valve element movable to a first position to establish a first flow path from one of said inlet ports to said first outlet port to thereby provide a first flow rate from said source to said servomotor means and movable to a second position to block said first flow path and establish another flow path from another one of said inlet ports to said second outlet port to thereby provide a second flow rate from said source to said servomotor means and movable to a third position to establish a third flow path from one of said inlet ports to said third of said outlet ports to thereby provide a third flow rate from said source to said servomotor means.

3. In a transmission, a friction-drive-establishing device having a fluid actuated servomotor for effecting the engagement of said friction-drive-establishing device, a flow control valve comprising unitary valve means movable to a plurality of positions for establishing a separate flow path through said valve and a different flow rate to said friction-drive-establishing device for each of said positions, said valve having a plurality of inlet ports and a plurality of outlet ports, said valve means being movable to a first position in which a first of said inlet ports is hydraulically connected with a first of said outlet ports for establishing a first fluid flow path and flow rate through said valve to effect the engagement of said friction device in a first predetermined time, said valve means being movable to a second position to establish a second fluid flow path through said valve through a second of said outlet ports and being further movable to a third position to establish a third flow path through said valve from another one of said inlet ports and through a third of said outlet ports, first fluid metering means hydraulically connected downstream of said second outlet port for establishing a different fluid flow rate through said valve in response to movement of said valve means to said second position to effect the engagement of said friction device in a second predetermined time, second fluid metering means hydraulically connected downstream of said third outlet port for establishing another different fluid flow rate through said valve in response to movement of said valve means to said third position to effect the engagement of said friction device in a third predetermined time.

4. In a transmission, a friction-drive-establishing device having a fluid operated servo motor, a timing valve for supplying fluid from a source of fluid pressure to said servomotor at different flow rates, a valve housing having a plurality of inlet ports connected to the source of fluid pressure and a plurality of outlet ports connected to the servomotor, a unitary valve element mounted in said housing and movable to a first position to hydraulically connect one of said inlet ports to one of said outlet ports to provide an unrestricted flow path to the servomotor to effect the operation of the servomotor in a first predetermined time, separate metering means downstream of each of the other outlet ports to meter fluid from said valve to the servomotor, said valve element being movable to a second position to provide a second flow path through said valve and through one of said metering means to effect the operation of a servo in a second predetermined time, and movable to a third position to provide a third flow path through said valve and through another of said metering means to effect the operation of said servo in a third predetermined time.

5. The combination of claim 4 including a spring for biasing said valve element in one direction toward a high flow position and variable fluid pressure means for biasing the valve element in an opposite direction toward a low flow position.

6. The combination of claim 4 in which said valve element is a one-piece element having a plurality of spaced lands thereon for selectively opening and closing said inlet and outlet ports in response to movement of said element to said different valve positions.

7. In a transmission, a gear unit having an input and an output, first and second hydraulically actuated gear-ratio-establishing means operatively connected to said gear unit for respectively establishing a low and a high ratio drive, shift control means operatively connected to said ratio establishing means having a first position for establishing said low ratio drive and a high ratio drive position for establishing said high ratio drive, timing valve means hydraulically connected to said low ratio establishing means, said timing valve means having a one-part valve element movable to establish three different flow paths through said timing valve to said first gear-ratio-establishing means, said valve element having a fast timing position for timing the engagement of said low ratio drives at a fast rate and having an intermediate timing position for timing the establishment of said low ratio drive at an intermediate rate and further having a slow timing position for timing the engagement of said low ratio drive at a slow rate, torque demand means operatively connected to said shift control means for increasingly biasing said shift control means to said low ratio position on increased torque demand, and speed responsive means operatively connected to said shift control means and said timing control means for increasingly biasing said shift control means to said high ratio position with increasing speed and for increasingly biasing said timing control means from said fast timing position to said intermediate timing position.

References Cited
UNITED STATES PATENTS

| | | | |
|---|---|---|---|
| 2,020,773 | 11/1935 | Ernst | 137—625.3 X |
| 2,105,625 | 1/1938 | Wichtendahl | 192—85 X |
| 2,942,583 | 6/1960 | Rue | 137—625.3 X |
| 3,027,918 | 4/1962 | Robra | 91—31 X |
| 3,383,956 | 5/1968 | Chana | 74—868 |
| 3,401,581 | 9/1968 | Chana | 74—868 X |

DONLEY J. STOCKING, Primary Examiner

THOMAS C. PERRY, Assistant Examiner

U.S. Cl. X.R.

91—31; 137—625.37; 192—109